(12) United States Patent
Sanap et al.

(10) Patent No.: US 11,662,908 B2
(45) Date of Patent: May 30, 2023

(54) SPACE-EFFICIENT STORAGE OF SYSTEM-MONITORING DATA

(71) Applicant: EMC IP Holding Company LLC, Hopkinton, MA (US)

(72) Inventors: Abhilash Sanap, Maharashtra (IN); Sunil Gumaste, Bengaluru (IN); Pankaj Soni, Sikar (IN); Ravish Sachdeva, Jammu & Kashmir (IN); Malak Alshawabkeh, Franklin, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 17/363,108

(22) Filed: Jun. 30, 2021

(65) Prior Publication Data
US 2023/0004301 A1    Jan. 5, 2023

(51) Int. Cl.
*G06F 3/06* (2006.01)
(52) U.S. Cl.
CPC .......... *G06F 3/0608* (2013.01); *G06F 3/0653* (2013.01); *G06F 3/0673* (2013.01)
(58) Field of Classification Search
CPC ..... G06F 3/0608; G06F 3/0653; G06F 3/0673
See application file for complete search history.

(56) References Cited

U.S. PATENT DOCUMENTS

| | | | |
|---|---|---|---|
| 2007/0140301 A1* | 6/2007 | Kailash | H04L 43/024 370/498 |
| 2016/0155076 A1* | 6/2016 | Fix | G06Q 10/06395 705/7.39 |
| 2022/0057960 A1* | 2/2022 | Boehm | G06F 3/0658 |

* cited by examiner

*Primary Examiner* — Zhuo H Li
(74) *Attorney, Agent, or Firm* — Muirhead and Saturnelli, LLC

(57) ABSTRACT

An amount of storage space required to maintain counter information for a storage system is reduced without reducing a temporal granularity or tracking granularity of the counter information. Rather than periodically recording actual (i.e., raw) counter values for counters, difference (i.e., delta) values may be recorded. For a given counter, a difference (delta value) between a value of the counter for a given point in time (PIT) and a value of the counter for a previous PIT may be determined, and this delta value may be stored as opposed to storing the raw counter value. This delta value may be a significantly smaller value than the raw value. To further reduce the amount of storage space required, no value may be stored for a counter for a given PIT if it is determined that there is no difference between a counter value for the given PIT and a previous PIT.

17 Claims, 8 Drawing Sheets

| | Date | Compnt. | Page | Item | Raw Counter Value |
|---|---|---|---|---|---|
| 501a | 2021-01-01 | EDS | 21 | 31 | 10,568,945,627 |
| 501b | 2021-01-01 | EDS | 21 | 32 | 56,025,697,630 |
| 501c | 2021-01-01 | EDS | 21 | 33 | 52,643,126,749 |
| 501d | 2021-01-01 | EDS | 21 | 34 | 56,456,856,201 |
| 501e | 2021-01-08 | EDS | 21 | 31 | 10,589,621,300 |
| 501f | 2021-01-08 | EDS | 21 | 32 | 56,026,235,689 |
| 501g | 2021-01-08 | EDS | 21 | 33 | 52,644,012,563 |
| 501h | 2021-01-08 | EDS | 21 | 34 | 56,456,856,201 |

| Date | Component | Page | Item | Delta Value |
|---|---|---|---|---|
| 2021-01-08 | EDS | 21 | 31 | 20,675,673 |
| 2021-01-08 | EDS | 21 | 32 | 538,059 |
| 2021-01-08 | EDS | 21 | 33 | 885,814 |
| 2021-01-08 | EDS | 21 | 34 | 0 |

| Date | Component | Page | Item | Delta Value |
|---|---|---|---|---|
| 01-08/2021 | EDS | 21 | 31 | 20,675,673 |
| 01-08/2021 | EDS | 21 | 32 | 538,059 |
| 01-08/2021 | EDS | 21 | 33 | 885,814 |

FIG. 5C

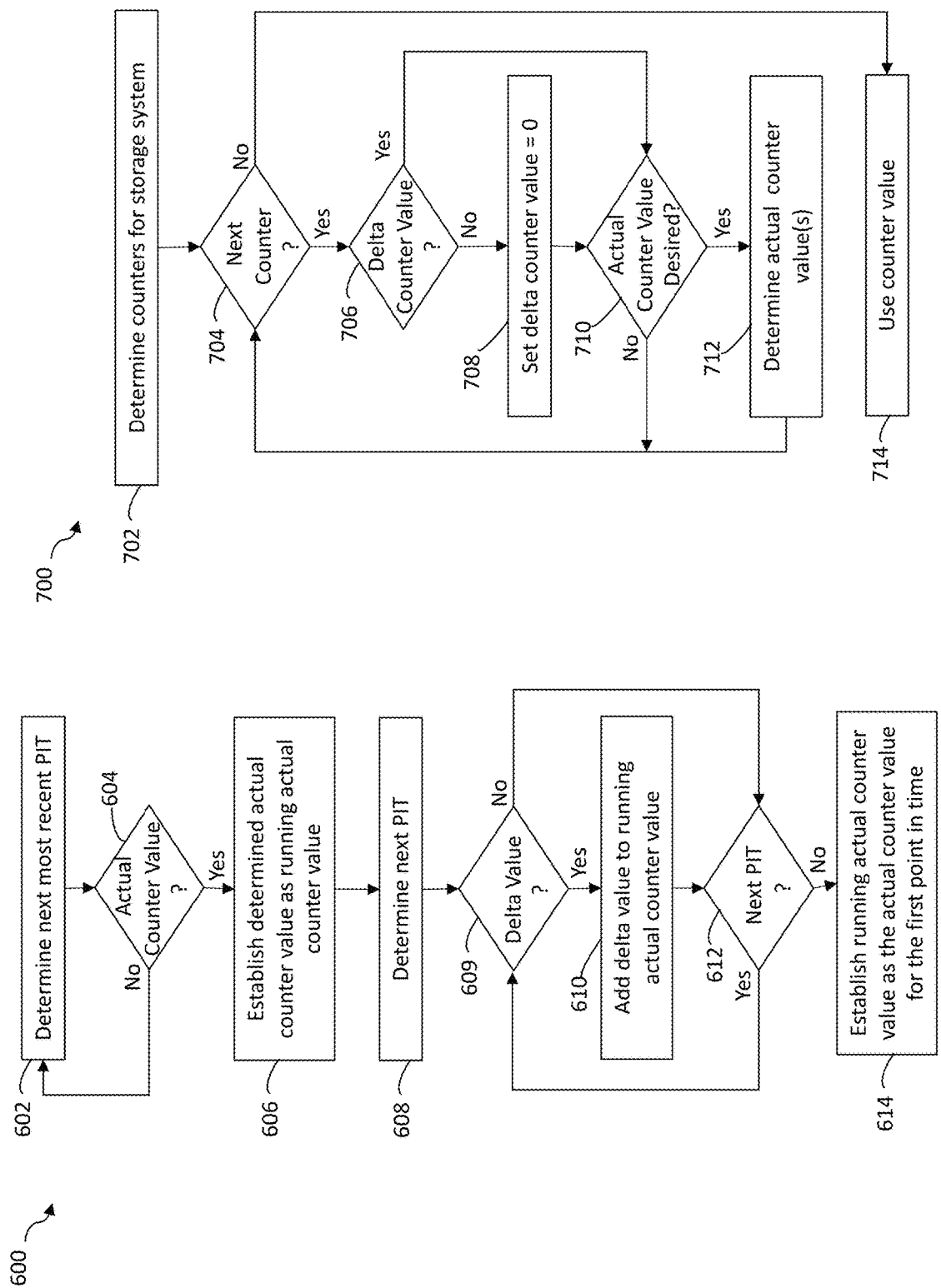

SPACE-EFFICIENT STORAGE OF SYSTEM-MONITORING DATA

BACKGROUND

Technical Field

This application generally relates to data storage systems, and more particularly to storing system-monitoring data in a space-efficient manner.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (I/O) operations utilizing a physical storage device of the storage system, one or more components of the host system, storage system and network components therebetween may be used. The one or more combinations of components of the host, switching fabric and storage system over which I/O operations between an application and the storage system may be communicated may be considered an I/O path between the application and the storage system. It should be appreciated that other combinations of components of a storage network, for example, two or more storage systems, also may be coupled together by one or more switches of a switching fabric. Thus, more generically, the one or more combinations of components of a first network component, switching fabric and second network component over which I/O communications may be communicated may be considered an I/O path between the two network components. The collective I/O paths between components of a storage network may be considered to define a connectivity of the storage network.

Host systems may not address the physical storage devices of a storage systems directly, but rather access to data may be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In an embodiment of the invention, a method includes: receiving counter information for a first point in time for a plurality of counters on a storage system, the counter information including a first counter value specifying a value of a first counter at the first point in time; obtaining a second counter value specifying a value of the first counter at a second point in time before the first point in time; determining whether there is a difference between the first counter value and the second counter value; if it is determined that there is a difference, persisting information associating the first counter with the difference for the first point in time; and refraining from persisting the first counter value. The method further may include, if it is determined that there is not any difference between the first counter value and the second counter value, refraining from storing any value for the first counter for the first point in time. The method may include: storing metadata reflecting that the counter information was generated for the first point in time, including counter information for the first counter; after the first point in time, determining that there was not a difference between the first counter value and the second counter value based on the metadata. The method further may include, after the first point in time, generating the first counter value based on the determination that there was not a difference between the first counter value and the second counter value. The method further may include: storing metadata reflecting that the counter information was generated for the first point in time, including counter information for the first counter; and, at a point in time after the first point in time, generating the first counter value from the metadata and the information associating the first counter with the difference for the first point in time. The metadata may be stored in at least a first relational database table, wherein difference information determined from the counter information, including the information associating the first counter with the difference for the first point in time, may be stored in at least a second relational database table, and wherein generating the first counter value may include executing an SQL join operation between the at least first relational database table and the at least second relational database table. The first counter may count occurrences of execution of a specific line of code on the storage system.

In another embodiment, a storage system includes executable logic that implements a method including: receiving counter information for a first point in time for a plurality of counters on a storage system, the counter information including a first counter value specifying a value of a first counter at the first point in time; obtaining a second counter value specifying a value of the first counter at a second point in time before the first point in time; determining whether there is a difference between the first counter value and the second counter value; if it is determined that there is a difference, persisting information associating the first counter with the difference for the first point in time; and refraining from persisting the first counter value. The method further may include, if it is determined that there is not any difference between the first counter value and the second counter value, refraining from storing any value for the first counter for the first point in time. The method may include: storing metadata reflecting that the counter information was generated for the first point in time, including counter information for the first counter; after the first point in time, determining that there was not a difference between the first counter value and the second counter value based on the metadata. The method further may include, after the first point in time, generating the first counter value based on the determination that there was not a difference between the first counter value and the second counter value. The method further may include: storing metadata reflecting that the counter information was generated for the first point in time, including counter information for the first counter; and, at a point in time after the first point in time, generating the first counter value from the metadata and the information associating the first counter with the difference for the first point in time. The metadata may be stored in at least a first relational database table, wherein difference information determined from the counter information, including the information associating the first counter with the difference for the first point in time, may be stored in at least a second relational database table, and wherein generating the first counter value may include executing an SQL join operation between the at least first relational database table and the at least second relational database table. The first counter may count occurrences of execution of a specific line of code on the storage system.

In another embodiment of the invention, computer-readable media has software stored thereon, the software including: executable code that controls receiving counter information for a first point in time for a plurality of counters on a storage system, the counter information including a first counter value specifying a value of a first counter at the first point in time; executable code that controls obtaining a second counter value specifying a value of the first counter at a second point in time before the first point in time; executable code that controls determining whether there is a difference between the first counter value and the second counter value; executable code that controls, if it is determined that there is a difference, persisting information associating the first counter with the difference for the first point in time; and executable code that controls refraining from persisting the first counter value. The software further may include executable code that controls, if it is determined that there is not any difference between the first counter value and the second counter value, refraining from storing any value for the first counter for the first point in time. The software further may include: executable code that controls storing metadata reflecting that the counter information was generated for the first point in time, including counter information for the first counter; and executable code that controls, after the first point in time, determining that there was not a difference between the first counter value and the second counter value based on the metadata. The software further may include executable code that controls, after the first point in time, generating the first counter value based on the determination that there was not a difference between the first counter value and the second counter value. The software further may include: executable code that controls storing metadata reflecting that the counter information was generated for the first point in time, including counter information for the first counter; and executable code that controls, at a point in time after the first point in time, generating the first counter value from the metadata and the information associating the first counter with the difference for the first point in time. The metadata may be stored in at least a first relational database table, wherein difference information determined from the counter information, including the information associating the first counter with the difference for the first point in time, may be stored in at least a second relational database table, and wherein generating the first counter value may include executing an SQL join operation between the at least first relational database table and the at least second relational database table.

BRIEF DESCRIPTION OF THE DRAWINGS

Features and advantages of the present invention will become more apparent from the following detailed description of illustrative embodiments thereof taken in conjunction with the accompanying drawings in which:

FIGS. 5A-5C illustrate stages of reducing counter data, according to embodiments of the invention;

FIG. 6 is a flow chart illustrating an example of a method of determining an actual counter value from reduced counter data, according to embodiments of the invention;

FIG. 7 is a flow chart illustrating an example of a method of expanding reduced counter data, according to embodiments of the invention.

DETAILED DESCRIPTION OF EMBODIMENTS

Figure 1:
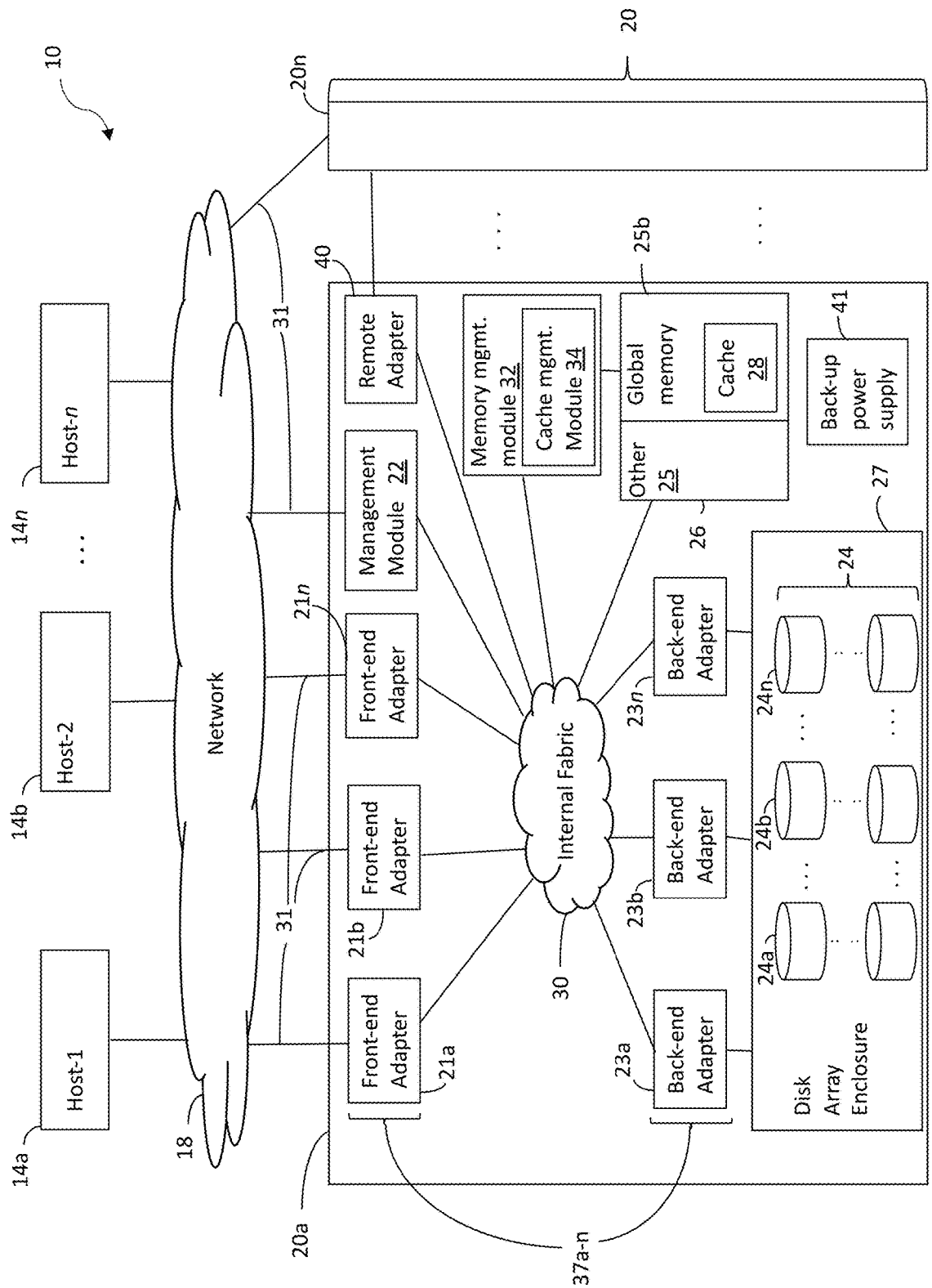
FIG. 1 is a block diagram illustrating an example of a data storage network, according to embodiments of the invention.

Monitoring data, e.g., utilization and performance data, for a storage system may be collected, tracked, generated and analyzed over time to assess behavior of a storage system, including particular physical and functional components thereof. Assessing system behavior may include diagnosing problems, which may result in modification of one or more aspects of the storage system (e.g., through modification of parameters) to address the diagnosed problems. Monitoring data may include counter values. For example, instructions may be placed in software that runs on the storage system, including low-level code, to increment a counter each time the code is executed. For example, such instructions may be placed in microcode found in Symmetrix™, VMAX™, VMAX3™ or PowerMax™ systems made available from EMC Corporation of Hopkinton, Mass. ("Dell EMC"), where the counter values produced by such instructions on such systems from Dell EMC may become part of what is referred to as "AI statistics."

The values of counters may be used to analyze code path utilization, e.g., under various conditions, providing useful insights to developers. In some cases, a storage system may be configured to collect monitoring data including counter values at predefined points in time, for example, periodically in accordance with a schedule, and to send the monitoring data to an entity (e.g., a vendor or a contract professional) that supports the storage system. The entity may store the monitoring data and use it to perform any of a variety of analysis, including, for example, diagnosing problems and forecasting future system behavior. Such an entity may maintain the history of monitoring data for the storage system, as well as other storage systems.

The number of counters tracked on a given system may be substantial, numbering in the thousands, ten of thousands, or even more. Further, the values of the counters (e.g., the number of times a piece of code is executed) may be substantial as well, for example, depending on how long the counter has been running and a rate at which the code that triggers the incrementing of the counter is hit. For example, piece of code may be executed millions, tens of millions, or even more, times per day, or very infrequently, perhaps only a few times a week or month, or even less. As a result, the amount of storage required to maintain counter values may be significant. In embodiments in which these counter values are periodically collected and reported to an entity, who then stores the reported counter values, the amount of storage to maintain a history of these counter values may be even more significant and growing at a significant rate.

To reduce an amount of storage consumed by counter values collected over time, the number of counters tracked may be reduced and/or counter values may be collected and recorded less frequently. However, the foregoing solutions result in less granular (i.e., coarser) counter information, which results in less precise analysis and perhaps less optimal trouble-shooting, forecasting or other types of analysis.

What may be desired is a way to reduce an amount of storage space required to store counter information accumulated over time for a storage system without sacrificing temporal granularity of the counter information or the number of counters tracked ("tracking granularity").

Described herein are techniques and mechanisms for reducing an amount of storage space required to maintain (i.e., keep stored) counter information for a storage system (e.g., for the purposed of monitoring utilization or performance) without reducing a temporal granularity or tracking granularity of the counter information. In some embodiments, rather than periodically recording the actual (i.e., raw) counter values for counters, difference (i.e., delta) values are recorded. For example, for a given counter, a difference (delta) between a value of the counter for a given (e.g., current) point in time and a value of the counter recorded for a previous (e.g., immediately preceding) point in time may be determined, and this delta value may be stored, as opposed to storing the raw counter value. That is, while the actual counter value of the given point in time may temporarily reside in memory (e.g., volatile memory) while counter values are being processed as described herein, the counter value may not be stored on a non-volatile medium (i.e., persisted) for later use Rather, the delta value for the given point in time may be persisted. The delta value may be a smaller (e.g., significantly smaller) value than the raw value for the point in time, depending on how long the counter has been counting (i.e., when it was initialized or last reset), the frequency with which the code corresponding to the counter is executed, and the amount of time between the given point in time and the previous point in time (e.g., based on the frequency of recording counter values). For example, whereas a 64-bit variable may be required to store the raw counter value, an 8-bit variable may be used to store its corresponding delta value.

In some embodiments, to further reduce the amount of storage space required to maintain counter information for a storage system, no value (i.e., no actual value or delta value) may be stored for a counter for a given point in time if it is determined that there is no difference between a counter value for the given PIT and a previous PIT. That is, if it determined that the counter has not been incremented (i.e., the corresponding code has not been accessed) since the last time the counter value was collected (e.g., reported), no value may be stored rather than storing a value representing "0." Not storing such null values may dramatically reduce the amount of storage space required to maintain counter information for a storage system, especially if a significant percentage of code is typically not accessed between collection points.

In some embodiments, an actual counter value for a counter for a given point in time on a storage system may be determined at a time after the point in time based on: metadata including information about the counters defined for the storage system and information indicating the points in time for which counter values were collected; the delta value (or lack thereof) stored for the given point in time; an actual counter value recorded for the counter for an earlier point in time; and perhaps delta values for other previous points in time if an immediately preceding point in time is not a point in time for which an actual value was recorded, as described in more detail elsewhere herein.

In some embodiments, one or more first relational database tables (or the like) are used to store metadata including information about the counters defined for the storage system and information indicating the points in time for which counter values were collected; and one or more second relational database tables are used to store delta values as described herein and at least one actual value for each counter. In such embodiments, determining an actual counter value for a counter for a given point in time on a storage system may be determined at a time later than the point in time by performing one or more SQL join operations (or the like) between the one or more first relational database tables and the one or more second relational database tables.

In should be appreciated that, while embodiments of the invention are described herein primarily in relation to counters, the invention is not so limited, and may apply to other types of parameter value being monitored by a system. Further, while embodiments of the invention are described herein primarily in relation to storage systems, the invention is not so limited, and may apply to other types of systems and components thereof, which may be part of or independent of a storage network.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14*a-n*; network 18; one or more storage systems 20*a-n*; other components; or any suitable combination of the foregoing. Storage systems 20*a-n*, connected to host systems 14*a-n* through network 18, may collectively constitute a distributed storage system 20. All of the host computers 14*a-n* and storage systems 20*a-n* may be located at the same physical site, or, alternatively, two or more host computers 14*a-n* and/or storage systems 20*a-n* may be located at different physical locations. Storage network 10 or portions thereof (e.g., one or more storage systems 20*a-n* in combination with network 18) may be any of a variety of types of storage networks, such as, for example, a storage area network (SAN), e.g., of a data center. Embodiments of the invention are described herein in reference to storage system 20*a*, but it should be appreciated that such embodiments may be implemented using other discrete storage systems (e.g., storage system 20*n*), alone or in combination with storage system 20*a*.

The N hosts 14*a-n* may access the storage system 20*a*, for example, in performing input/output (I/O) operations or data requests, through network 18. For example, each of hosts 14*a-n* may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a switching fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more front-end adapters ("FAs") 21a-n (e.g., directors configured to serve as FAs), which also may be referred to herein as host adapters ("HAs"). Each of these FAs may be used to manage communications and data operations between one or more host systems and global memory (GM) 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to perform storage management functions or services such as, for example, storage provisioning, device configuration, tier management, other services, or any combination of other services. The management module 22 also may be configured to perform, or assist in performing analysis such as, for example, performance and/or utilization analysis and/or forecasting of system behavior, the result of which may inform other management functions performed by the management module 22. The management module 22 may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n, as an independent management server, or as part of another separate system connected to storage system 20a via network 18. In some embodiments, the management and analysis functions described herein may be performed using both resource of the management module 22 of the storage system 20a and one management resources located externally to the storage system, for example, on a host system, management server and/or other components.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing I/O operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (TB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

The memory 26 may include persistent memory for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof—e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

The storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Any of storage systems 20a-n, or one or more components thereof, described in relation to FIG. 1 may be implemented using one or more Symmetrix™, VIVIAX™, VIVIAX3™ or PowerMax™ systems made available from Dell EMC.

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

In some embodiments of the storage network 10, an amount of storage space required to maintain (i.e., keep stored) counter information for one or more of the storage systems 20a-n may be reduced without reducing a temporal granularity or tracking granularity of the counter information, for example, as will now be described.

Figure 2:
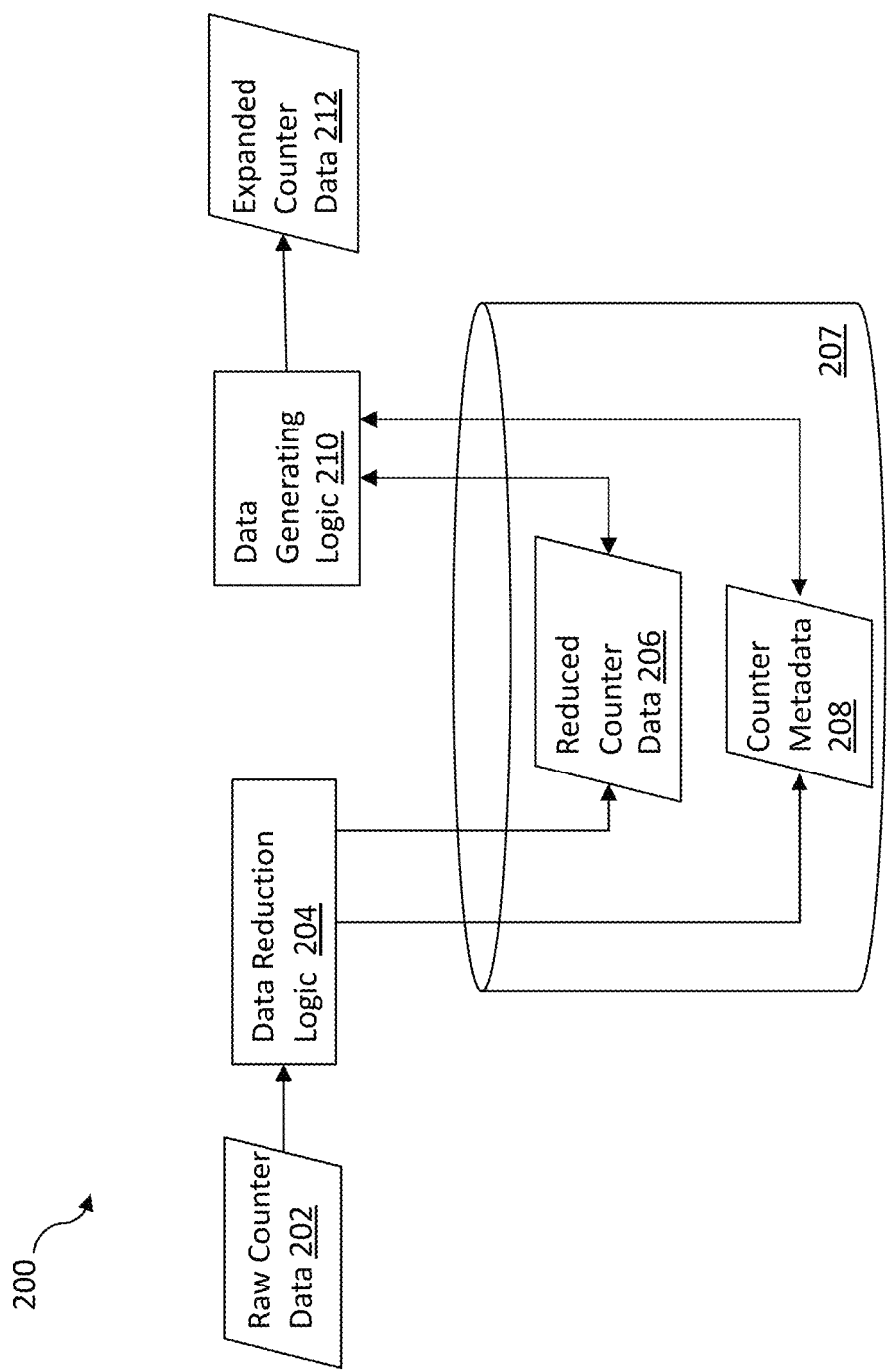
FIG. 2 is a data flow diagram illustrating an example of a system for space-efficient storage of counter data, according to embodiments of the invention.

FIG. 2 is a data flow diagram illustrating an example of a system 200 for space-efficient storage of counter data, according to embodiments of the invention. Other embodiments of a system for space-efficient storage of counter data, for example, variations of the system 200, are possible and are intended to fall within the scope of the invention. The system 200 may be implemented using one or more components of the data storage network 10, for example, management resources of the management module 22 and/or management resources located externally to the storage system 20a, for example, as part of a host system and/or management server.

The system may include any of: data reduction logic 204; data generating logic 210; non-volatile data storage 207 including reduced counter data 206 and counter metadata 208; other components; and any suitable combination of the foregoing. Each of the data reduction logic 204 and data generating logic 210 may be implemented using, software, firmware or hardware or any suitable combination thereof.

The data reduction logic 204 may be configured to receive raw counter data 202 and generate the reduced counter data 206 and at least some of counter metadata 208, for example, as described elsewhere herein. For example, the reduced counter data may include only determined delta values, and may not include any null delta values. The reduced counter data 206 also may include delta values determined for previous points in time, and, for each counter, at least one raw (i.e., actual) counter value from a previous point in time.

As is described in more detail herein, an actual counter value may be determined for a point in time based at least in part on the actual counter value from an earlier point in time.

The counter metadata 208 may include information relating to: the counters corresponding to the counter data 206; different points in time at which counter data was collected; other information about the system 200; and any suitable combination of the foregoing, as described in more detail elsewhere herein. At least some of the counter metadata 208 may have been generated and stored in the data storage 207 independent of the reduction of data by the data reduction logic 204. In some embodiments, the reduced data 206 and counter metadata 208 may be stored in relational database tables, for example, in a star schema, as described in more detail elsewhere herein.

The data generating logic 210 may be configured to access the reduced counter data 206 and corresponding metadata of the counter metadata and generated expanded counter data 212 therefrom, for example, as described in more details elsewhere herein. For example, if the reduced counter data 206 and counter metadata 208 are implemented as relational database tables, the data generating logic 210 may be configured to perform one or more SQL join operations or the like between the relational database tables to produce the expanded counter data 212. The expanded counter data 212 may include, for example, the original raw counter data from which the reduced counter data 206 was created or a variation thereof.

Figure 3:
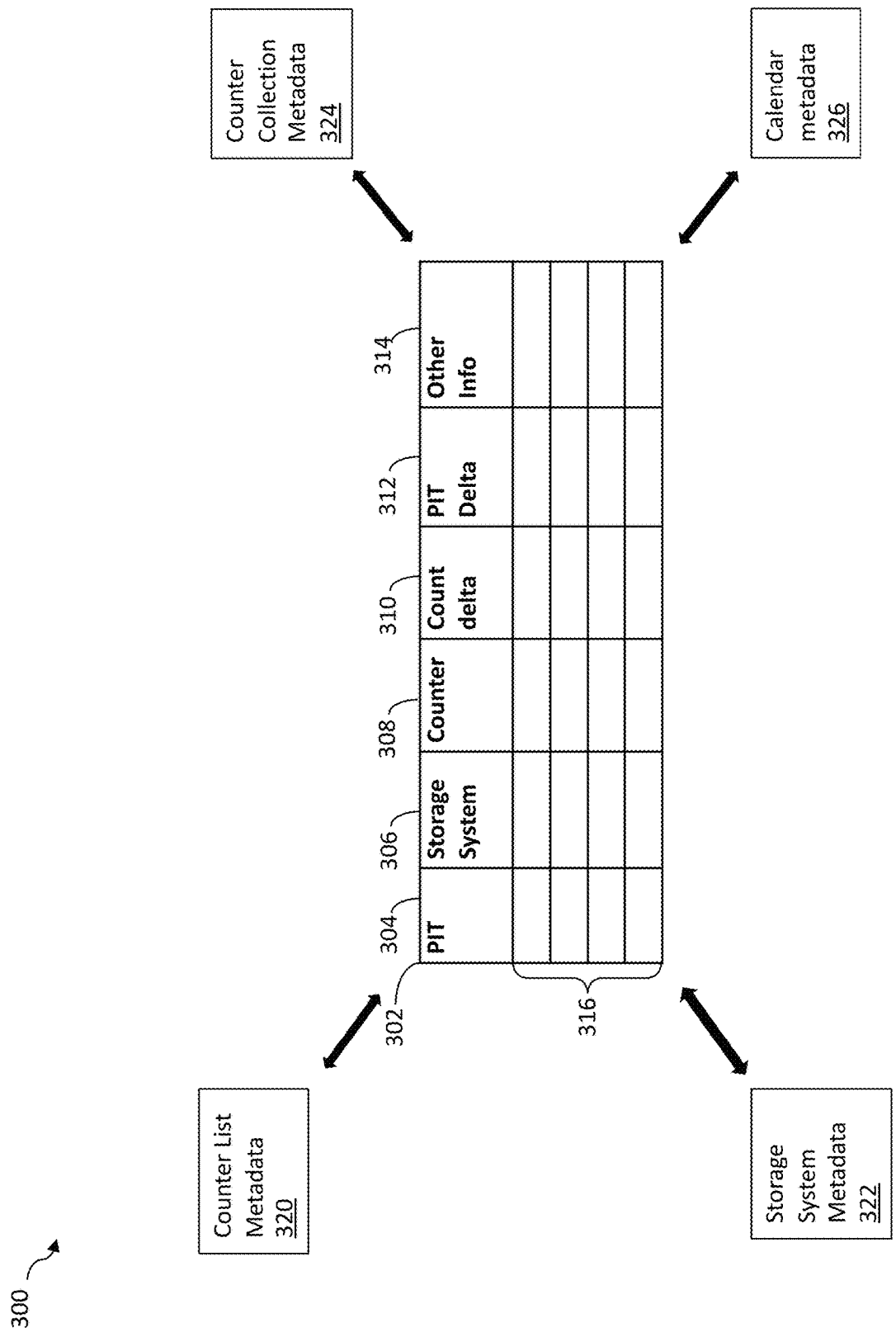
FIG. 3 is a block diagram illustrating an example of a data schema for space-efficient storage of counter data, according to embodiments of the invention.

FIG. 3 is a block diagram illustrating an example of a data schema 300 for space-efficient storage of counter data, according to embodiments of the invention. Other embodiments of a data schema for space-efficient storage of counter data, for example, variations of the data schema 300, are possible and are intended to fall within the scope of the invention. The data schema 300 may be used to implement the reduced counter data 206 and the counter metadata 208.

In some embodiments, reduced counter data (e.g., the reduced counter data 206) may be stored in a reduced counter data table (RCDT) 302. The RCDT 302 may include a plurality of entries 316, where each entry 316 represents a delta value for a counter of a storage system for raw counter data collected at a specific point in time. Each entry 316 may specify, for the delta value represented by the entry: a point in time at which the raw data was collected in a point in time column 304; a storage system ID of the storage system of the counter in storage system column 306; a counter ID of the counter in counter column 308; the delta value in count delta column 310; a difference between the point in time represented by the entry and the previous point in time from which the delta value was calculated in PTI delta column 312; and other information in one or more columns 314. It should be appreciated that the temporal granularity of the information stored in the point in time column 304 and the point in time delta column 312 is configurable, for example, day (i.e., date) or time of day. The one or more other information columns may specify, for example, an actual counter value for the counter and point in time specified by an entry. This field typically may be left blank, but may be predefined to be populated periodically for use in determining actual counter values of the counter for later points in time, as described in more detail elsewhere herein.

The data schema 300 also may include a plurality of metadata tables 320, 322, 324 and 326 that store metadata corresponding to the counters for which counter data is being tracked, and may be used to implement the counter metadata 208. The counter list metadata 320 may include information related to the counters available on a system (e.g., a data storage network 10). The counter list metadata 320 may specify a list of counters for a given version of a codebase of a storage system or component thereof. In some embodiments, for example, when the storage system is implemented by a PowerMax system, for a particular version of a codebase and functional component thereof, counters may be organized into pages, and each counter may have a page item number within each page, and this information may be captured in the counter list metadata 320.

The storage system metadata 322 may include a plurality of entries, each entry corresponding to a storage system. For example, each entry may be keyed by a storage system ID, and additionally in some embodiments by a component thereof (e.g., director or emulator ID), and may specify information specific to the storage system (or component), including, for example, a version of the codebase (e.g., microcode) of the storage system or component.

The counter collection metadata 324 may include information that specifies, for storage systems and points in time (e.g., dates), information specific to the collection of the counter data collected at the point in time, including, for example, a total number of counters for which delta values (e.g., non-zero delta values) are stored for the point in time, the previous point in time for which delta values were determined, a last point in time for which raw counter values were stored, etc. Calendar metadata 326 may store calendar information corresponding to a point in time, for example, day name, day or week, month name, timestamp, etc.

It should be appreciated that in embodiments of the data schema 300 described herein, the RCDT 302 experiences a significant growth rate as counter data is collected over time relative to the rate of growth of the metadata tables 320, 322, 324 and 326. This phenomenon may further conserve data storage over time compared to a schema in which the counter data and metadata are not adequately segregated so that data is redundantly stored, for example, in multiple tables, which grow at a rate commensurate with the RCDT 302 as counter data is collected. In some embodiments, the data schema 300 is implemented as a star schema in which the RCDT 302 is a fact table and the metadata tables 320, 322, 324 and 326 are dimension tables.

Figure 4:
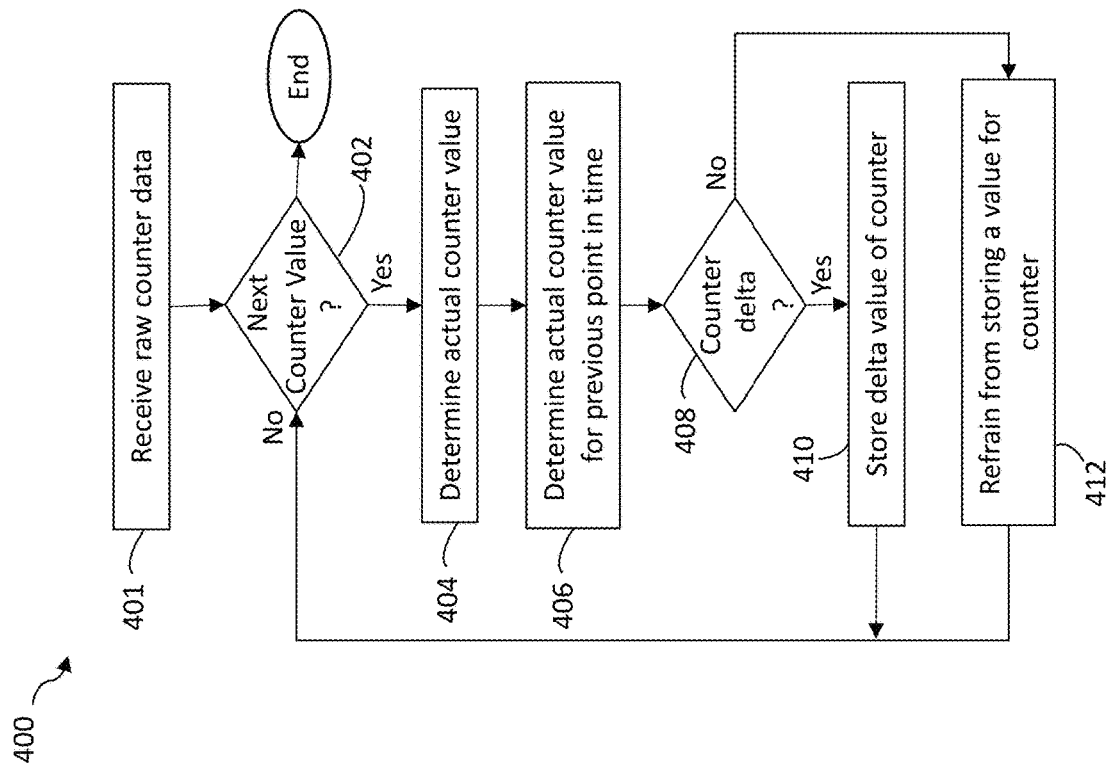
FIG. 4 is a flow chart illustrating an example of a method of reducing counter data, according to embodiments of the invention.

FIG. 4 is a flow chart illustrating an example of a method 400 of reducing counter data, according to embodiments of the invention. Other embodiments of a method of reducing counter data, for example, variations of the method 400, are possible and are intended to fall within the scope of the invention. The method 400 may be implemented in whole or in part by the data reduction logic 204.

In a step 401, raw counter data for a point in time may be received. The point in time may be a predefined time, for example, in accordance with a schedule, or in response to an event, for example, user input. The raw counter data may be received remotely at a management server from a storage system or received locally at a management module (e.g., the management module 22) within the storage system (e.g., the storage system 20a).

The raw counter data may be organized according to an extensive markup language (XML) format (or in accordance with another markup language or other format type), for example, in one or more XML files. For example, each XML file may contain a plurality of markup objects, where each object defines a counter value determined for a respective counter at the point in time. The one or more XML files may be contained in an archive file, which may be unpackaged to access the one or more XML files to process the raw counter data.

In a step 402, it may be determined whether there is a next counter value in the raw counter data to process. On a first pass through steps 402-412, the answer should be affirmative, unless there are no counters defined. Determining whether there is a next counter value to process may include parsing one or more XML files unpackaged in the step 401, including, for example, accessing a next XML object in the current XML file being processed or accessing a next XML file of counter values.

If it determined in the step 402 that there is a next counter value to process, the counter value may be determined in a step 404. For example, the next counter value may be read from an XML object extracted from an XML file.

In a step 406, a previous actual counter value for the counter—i.e., an actual counter value for an immediately preceding point in time for which counter values were collected—may be determined. In some embodiments, this determination may simply be made by accessing the previous counter value from data storage, for example, from the data storage 207. For example, in some embodiments, actual counter values may be saved for each point in time until the counter data for a next point in time is processed (and differences determined), after which the actual counter values may be determined. In some embodiments, the step 406 may be performed by performance of a method 600, described in more detail below in relation to FIG. 6.

In a step 408, it may be determined whether there is a difference (delta) between the determined actual counter value for the point in time and the determined actual counter value for the previous point in time (i.e., the immediately preceding point in time for which counter values were determined). For example, the determination may be made by subtracting the actual counter value for the previous point in time from the actual counter value for the point in time.

If it is determined in the step 408 that there is a difference (i.e., a non-zero value), then in a step 410, the delta value may be stored, for example, as part of the reduced counter data 206. Otherwise, in a step 412, the system may refrain from storing a value for the counter. In some embodiments, if it is determined in the step 408 that there is not a difference, a null/zero value may be stored, for example, temporarily in a transitional data structure, as an intermediate step, before discarding the record of the null delta value.

In some embodiments, if it is determined that the difference between the actual counter value for the point in time and the actual counter value for the previous point in time is a negative number (i.e., the actual counter value for the previous point in time is greater) this may mean that the counter was reset between points in time, in which case a delta value may not be stored in the step 410. Rather, an indication that the delta value is invalid and/or that the counter was reset may be recorded.

Following the performance of either step 410 or 412, the method 400 may return to the step 402 to perform the steps 404-412 for a next counter received in the step 401 as part of the raw counter data for the point in time. If it is determined in the step 402 that there is not a next counter value in the raw counter data for the point in time, the method 400 may end.

An example of the performance of the method 400 will now be described in relation to FIGS. 5A-5C, which illustrate stages of reducing counter data, according to embodiments of the invention.

Referring to FIG. 5A, a table 500 includes a plurality of entries 501, where each entry 501*a-h* may represent a raw counter value included in raw counter data received in the step 401. For example, each entry 501*a-d* may represent a raw counter value included in raw counter data received for a first point in time, and each entry 501*e-h* may represent a raw counter value included in raw counter data received for a second point in time. Each entry 501*a-h* may specify: a point in time (e.g., date) of the counter value in column 502, a component (e.g., emulation on a PowerMax system) of the storage system corresponding to the counter value in column 405, a page and item number of the counter in columns 506 and 508, respectively, and a raw counter value in column 510. It should be appreciated that when the entries 501*e-h* are received, the raw data values in column 510 reflected in entries 501*a-d* may not be currently stored on the system according to embodiments of the invention.

FIG. 5B includes a table 520 illustrating an example of what delta values may result for the raw counter values in column 510 for entries 501*e-h* of table 500 after performance of the step 408. The entries 521*e-h* of the table 520 correspond to the entries 501*e-h* of the table 500. The values in column 529 of rows 521*e-h* are the delta values resulting from calculating the respective differences between the raw values in column 509 of entries 501*e-h* and entries 501*a-d*, respectively. Column 529 of the entry 521*h* shows the delta value for the difference between: the raw value for the counter identified by the EDS emulation, page 21, item 34 on Jan. 8, 2021, specified in column 510 of entry 501*h*; and the raw value of such counter on Jan. 1, 2021 specified in column 510 of entry 501*e*. As shown, this delta value is a null value (=0).

FIG. 5C includes a table 540 illustrating which delta values specified in column 529 of entries 521*e-h* may be stored on a non-volatile medium (i.e., persisted) for later use a result of performance of the steps 410 and 412 of the method 400. The entries 541*e-g* of the table 540, each of which have a non-zero delta value specified in the column 529, corresponding to entries 521*e-g* in the table 520, respectively, and will be stored on a non-volatile medium (i.e., persisted) for later use a result of performance of the step 410. In contrast, the entry 521*h* of the table 520 has a null delta value specified in the column 529 and will not be stored on a non-volatile medium (i.e., not persisted) for later use a result of performance of the step 412.

FIG. 6 is a flow chart illustrating an example of a method 600 of determining an actual counter value from reduced counter data for a point in time, according to embodiments of the invention. Other embodiments of a method of determining an actual counter value from reduced counter data for a point in time, for example, variations of the method 600, are possible and are intended to fall within the scope of the invention. The method 600 may be used to execute the step 406 of the method 400. In the context of method 600, the point in time for which an actual counter value will be determined is referred to herein as referred to as the first point in time.

In a step 602, a next most recent point in time—relative to the first point in time—for which counter values were collected may be determined, for example, from counter collection metadata 324. In a step 604, it may be determined whether an actual counter value is specified for the counter for this next most recent point in time. This determination may be made, for example, by accessing the appropriate parameter value in counter metadata (e.g., in counter collection metadata 324) or by accessing a value specified in a field of the entry in RCDT 302 for the counter for such point in time. For example, the RCDT 302 may have a column for specifying actual counter values, where such column typically may be left blank, but may be populated periodically (e.g., much less frequently than counter values are collected), for example, per configuration of the data reduction logic 204. The value in such column in the RCDT 302 entry for the counter for such point in time may be accessed in the step 604. Alternatively, the actual counter value may be stored in a location other than the RCDT 302 entry for the counter for such point in time; and the RCDT 302 entry alternatively may include a parameter value specifying whether an actual counter value exists for the counter for this point in time, and such entry may specify a reference (e.g., a pointer) to the location thereof.

In some embodiments, counter metadata (e.g., counter collection metadata 324) specifies, for each counter, a most recent point in time for which an actual counter value is stored for the counter, and the iterative performance of the steps 602 and 604 is not necessary. In some embodiments, the system may be configured so that each counter has a same most recent point in time for which an actual counter value is stored for the counter such that the determination of such most recent point in time only has to be made once for all counters.

It should be appreciated that, in some cases, the last actual counter value specified for a counter may be zero (i.e., =0), for example, if an actual counter value for the counter has not been recorded since the counter was initiated or last reset.

The actual counter value determined from performance of the steps 602 and 604 may be established as the running actual counter value in a step 606 and used to determine the actual counter value for the first point in time, for example, by adding the delta counter values for the counter for intervening points in time, e.g., by iterative performance of steps 608-612.

In a step 608, a next point in time (from the point in time determined from steps 602 and 604) for which counter data was collected may be determined, for example, from counter metadata. In a step 609, it may be determined whether a delta counter value is specified for the counter for such next point in time, for example, by determining whether an RCDT 302 entry exists for the counter for such next point in time. If such delta value is specified, it is added to the running actual counter value in 610.

After performance of the step 610, or if it is determined in the step 609 that there is not a delta counter value specified for the counter for the next point in time, it may be determined if there is a next a point in time for which counter data was collected in a step 612. If so, the method 600 may return to the step 609. If it is determined in the step 612 that there is not a next point in time, the tallying of the delta values of the intervening points in time may be deemed complete, and in a step 614 the running actual counter value may be established as the actual counter value for the first point in time.

It may be desirable to expand reduced counter data, for example, produced from execution of the method 400, when performing analysis on, or reporting information about, a storage system.

FIG. 7 is a flow chart illustrating an example of a method 700 of expanding reduced counter data for a point in time, according to embodiments of the invention. Other embodiments of a method of expanding reduced counter data for a point in time, for example, variations of the method 700, are possible and are intended to fall within the scope of the invention. The method 700 may be performed by the data generating logic 210.

In a step 702, the counters for a storage system, or for one or more components of a storage system for which counters are desired, may be determined. For example, a version of a codebase (e.g., microcode) for a storage system or component thereof may be determined by accessing counter metadata 208, for example, from storage system metadata 322, e.g., from one or more entries in a table corresponding to the ID of the storage system and/or component thereof. From the codebase version of the system and/or component, a list of counters defined for the codebase version may be determined from counter metadata 208, for example, from counter list metadata 320, e.g., from one or more entries in a table corresponding to the codebase version.

Each counter determined in the step 702 then may be processed in steps 704-712. In a step 704, it may be determined whether there is a next counter from the list of counters to be processed, which should be affirmative for a first pass through steps 704-712. If there is a next counter, then in a step 706 it may be determined whether there is a delta value specified for the counter for the point in time under consideration, for example, by accessing the RCDT 302. If there is not such a delta value, this means that it was previously determined that there was no difference between the actual counter value for the given point in time and the actual counter value for an immediately preceding point in time, in which case a delta value may be set to 0 for the counter for the current point in time, e.g., in a data structure being used to expand the reduced counter data.

In some embodiments, the performance of the steps 702-708 includes performing an SQL join of relational database tables of the counter data and metadata described in relation to the steps 702-708, for example, an SQL join of the RCDT 302 the the counter list metadata 320.

In some embodiments, only the delta values (including zero values) for the counters for the given point in time may be desired for whatever analysis is being performed. In other embodiments, the actual values of the counters for the given point in time may be desired for analysis. In a step 710, it may be determined whether an actual counter value is desired, which may be determined based on a parameter value set before initiating performance of the method 702. If not, then the method 700 may return to the step 704.

If it is determined in the step 710 that an actual counter value is desired, then an actual counter value for the point in time may be determined, for example, by performance of the method 600. After performance of the step 712, the method 700 may return to the step 704.

If it is determined in the step 704 that there is not a next counter, then in a step 714 the counter values (delta or actual) determined by performance of the steps 702-712 may be used, for example, to forecast system behavior or to determine and diagnose problems.

Figure 8:
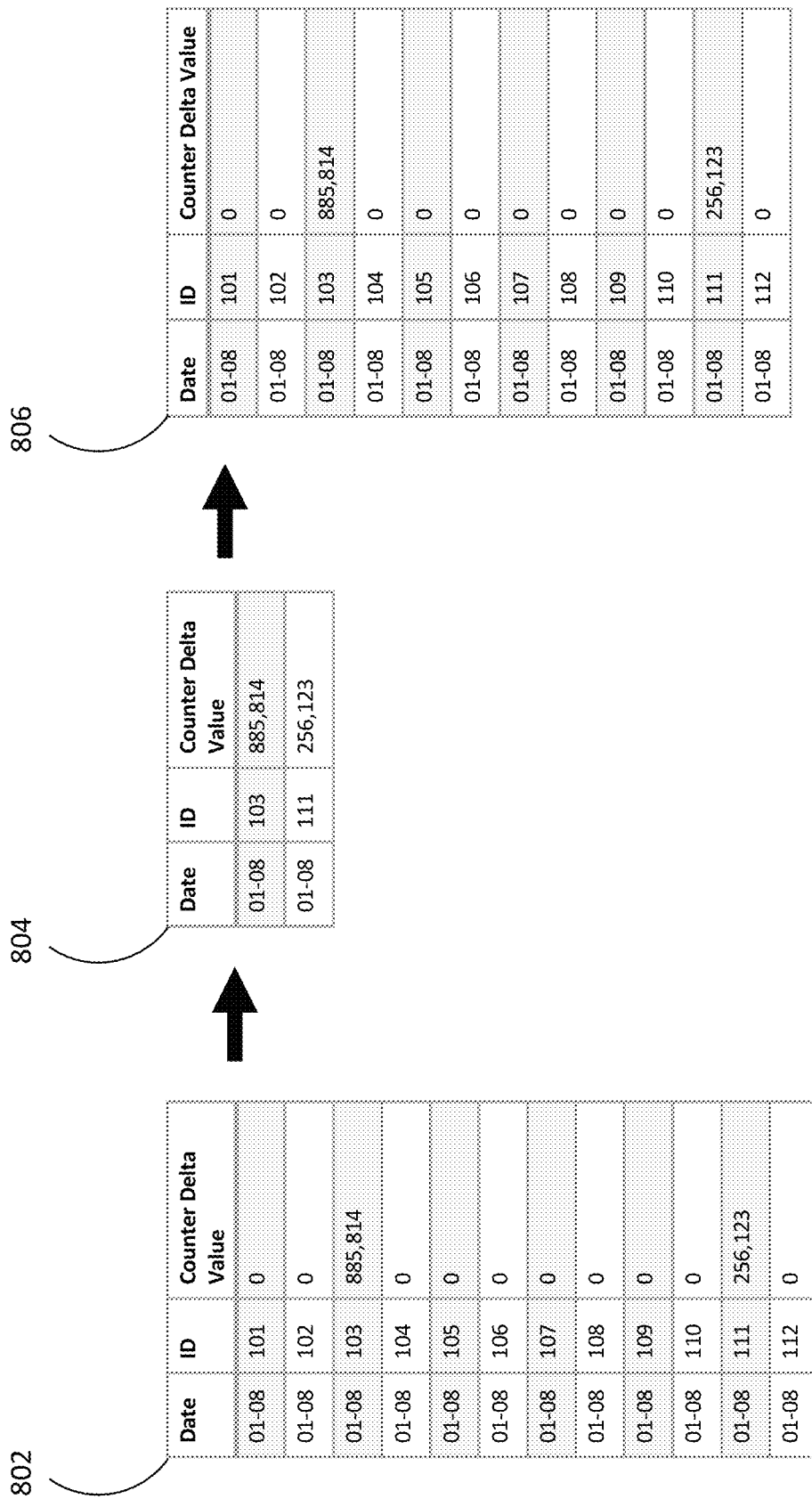
FIG. 8 illustrates reduced and expanded counter data, according to embodiments of the invention.

FIG. 8 illustrates reduced and expanded counter data, according to embodiments of the invention. The table 802 includes a list of delta counter values that may result, for example, by determining delta values for a set of counters, but prior to removing any zero delta values. The table 804 includes a reduced list of delta values resulting from removing any zero delta values form the list in table 802. The contents of the table 804 is an example of reduced counter data that may result from performance of the method 400 on raw counter data; whereas the table 802 may reflect a transitional state of counter data between the raw and reduced state. As can be seen by comparing tables 802 and 804, significant savings of storage space may be realized by not persisting zero delta values.

The table 806, which has the same contents as table 802, includes a list of delta counter values that may result, for example, by expanding the reduced counter data of table 804 in accordance with the method 700 when actual counter values are not desired.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 400, 700 and 800, or parts thereof, may be implemented using one or more of the systems and/or data structures described in relation to FIGS. 1-3 or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, or any suitable combination thereof.

Software implementations of embodiments of the invention may include executable code that is stored on one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate operating system.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicate a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method comprising:
 receiving counter information for a first point in time for a plurality of counters on a storage system, the counter information including a first counter value specifying a value of a first counter at the first point in time;
 obtaining a second counter value specifying a value of the first counter at a second point in time before the first point in time;

determining whether there is a difference between the first counter value and the second counter value;

if it is determined that there is a difference, persisting information associating the first counter with the difference for the first point in time;

refraining from persisting the first counter value;

storing metadata reflecting that the counter information, including first counter information for the first counter, was generated for the first point in time; and after the first point in time, determining that there was not a difference between the first counter value and the second counter value based on the metadata.

2. The method of claim 1, further comprising:

if it is determined that there is not any difference between the first counter value and the second counter value, refraining from storing any value for the first counter for the first point in time.

3. The method of claim 1, further comprising:

after the first point in time, generating the first counter value based on the determination that there was not a difference between the first counter value and the second counter value.

4. The method of claim 1, wherein the first counter counts occurrences of execution of a specific line of code on the storage system.

5. A method comprising:

receiving counter information for a first point in time for a plurality of counters on a storage system, the counter information including a first counter value specifying a value of a first counter at the first point in time;

obtaining a second counter value specifying a value of the first counter at a second point in time before the first point in time;

determining whether there is a difference between the first counter value and the second counter value;

if it is determined that there is a difference, persisting information associating the first counter with the difference for the first point in time;

refraining from persisting the first counter value;

storing metadata reflecting that the counter information, including first counter information for the first counter, was generated for the first point in time; and at a point in time after the first point in time, generating the first counter value from the metadata and the information associating the first counter with the difference for the first point in time.

6. The method of claim 5, wherein the metadata is stored in at least a first relational database table, wherein difference information determined from the counter information, including the information associating the first counter with the difference for the first point in time, is stored in at least a second relational database table, and wherein generating the first counter value includes executing a structured query language (SQL) join operation between the at least first relational database table and the at least second relational database table.

7. A storage system comprising;

one or more processors: and a memory comprising executable code that, when executed, performs a method including:

receiving counter information for a first point in time for a plurality of counters on a storage system, the counter information including a first counter value specifying a value of a first counter at the first point in time;

obtaining a second counter value specifying a value of the first counter at a second point in time before the first point in time;

determining whether there is a difference between the first counter value and the second counter value;

if it is determined that there is a difference, persisting information associating the first counter with the difference for the first point in time;

refraining from persisting the first counter value;

storing metadata reflecting that the counter information, including first counter information for the first counter, was generated for the first point in time; and after the first point in time, determining that there was not a difference between the first counter value and the second counter value based on the metadata.

8. The system of claim 7, wherein the method further comprises:

if it is determined that there is not any difference between the first counter value and the second counter value, refraining from storing any value for the first counter for the first point in time.

9. The system of claim 7, wherein the method further comprises:

after the first point in time, generating the first counter value based on the determination that there was not a difference between the first counter value and the second counter value.

10. A storage system comprising:

one or more processors: and a memory comprising executable code that, when executed, performs a method including:

receiving counter information for a first point in time for a plurality of counters on a storage system, the counter information including a first counter value specifying a value of a first counter at the first point in time;

obtaining a second counter value specifying a value of the first counter at a second point in time before the first point in time;

determining whether there is a difference between the first counter value and the second counter value;

if it is determined that there is a difference, persisting information associating the first counter with the difference for the first point in time;

refraining from persisting the first counter value;

storing metadata reflecting that the counter information, including first counter information for the first counter, was generated for the first point in time; and at a point in time after the first point in time, generating the first counter value from the metadata and the information associating the first counter with the difference for the first point in time.

11. The system of claim 10, wherein the metadata is stored in at least a first relational database table, wherein difference information determined from the counter information, including the information associating the first counter with the difference for the first point in time, is stored in at least a second relational database table, and wherein generating the first counter value includes executing a structured query language (SQL) join operation between the at least first relational database table and the at least second relational database table.

12. The system of claim 11, wherein the first counter counts occurrences of execution of a specific line of code on the storage system.

13. One or more non-transitory computer-readable media having software stored thereon, the software comprising:
   executable code that controls receiving counter information for a first point in time for a plurality of counters on a storage system, the counter information including a first counter value specifying a value of a first counter at the first point in time;
   executable code that controls obtaining a second counter value specifying a value of the first counter at a second point in time before the first point in time;
   executable code that controls determining whether there is a difference between the first counter value and the second counter value;
   executable code that controls, if it is determined that there is a difference, persisting information associating the first counter with the difference for the first point in time;
   executable code that controls refraining from persisting the first counter value;
   executable code that controls storing metadata reflecting that the counter information, including first counter information for the first counter, was generated for the first point in time; and
   executable code that controls, after the first point in time, determining that there was not a difference between the first counter value and the second counter value based on the metadata.

14. The one or more non-transitory computer-readable media of claim 13, wherein the software further comprises:
   executable code that controls, if it is determined that there is not any difference between the first counter value and the second counter value, refraining from storing any value for the first counter for the first point in time.

15. The one or more non-transitory computer-readable media of claim 13, wherein the software further comprises:
   executable code that controls, after the first point in time, generating the first counter value based on the determination that there was not a difference between the first counter value and the second counter value.

16. One or more non-transitory computer-readable media having software stored thereon, the software comprising:
   executable code that controls receiving counter information for a first point in time for a plurality of counters on a storage system, the counter information including a first counter value specifying a value of a first counter at the first point in time;
   executable code that controls obtaining a second counter value specifying a value of the first counter at a second point in time before the first point in time;
   executable code that controls determining whether there is a difference between the first counter value and the second counter value;
   executable code that controls, if it is determined that there is a difference, persisting information associating the first counter with the difference for the first point in time;
   executable code that controls refraining from persisting the first counter value;
   executable code that controls storing metadata reflecting that the counter information, including first counter information for the first counter, was generated for the first point in time; and
   executable code that controls, at a point in time after the first point in time, generating the first counter value from the metadata and the information associating the first counter with the difference for the first point in time.

17. The one or more non-transitory computer-readable media of claim 16, wherein the metadata is stored in at least a first relational database table,
   wherein difference information determined from the counter information, including the information associating the first counter with the difference for the first point in time, is stored in at least a second relational database table, and
   wherein generating the first counter value includes executing a structured query language (SQL) join operation between the at least first relational database table and the at least second relational database table.

* * * * *